April 28, 1942.   J. KURILLA   2,281,314
SWITCH
Filed May 26, 1941
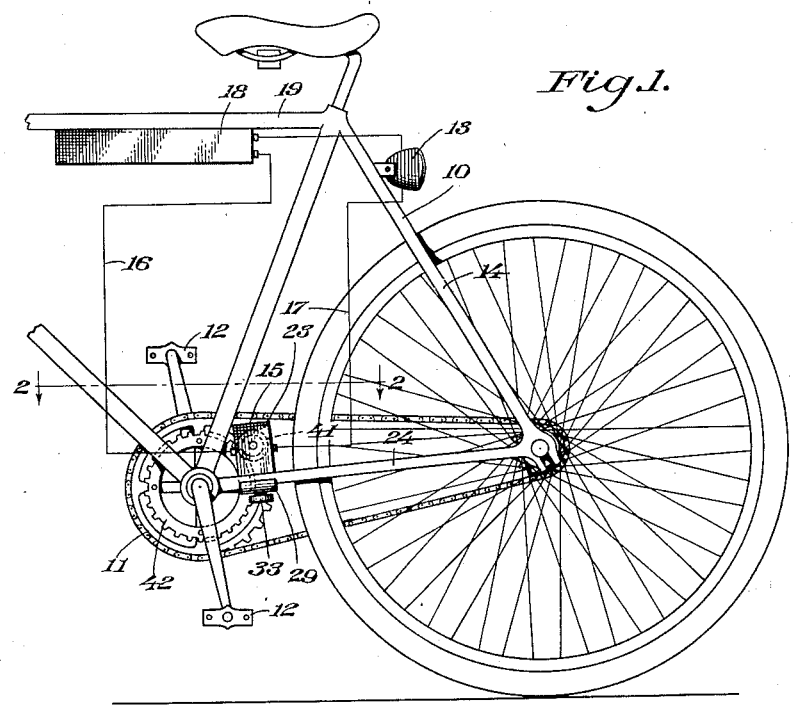
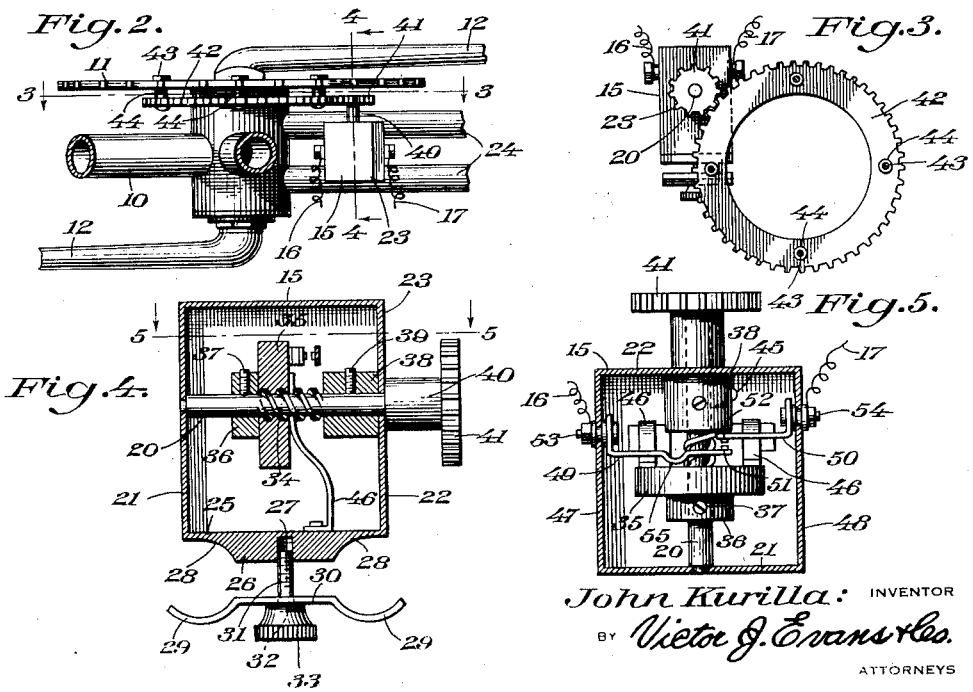
John Kurilla: INVENTOR
BY Victor J. Evans & Co.
ATTORNEYS Patented Apr. 28, 1942

2,281,314

UNITED STATES PATENT OFFICE 2,281,314

SWITCH

John Kurilla, Berwick, Pa.

Application May 26, 1941, Serial No. 395,256

3 Claims. (Cl. 200—52)

My invention relates to bicycle signalling devices, and has among its objects and advantages the provision of an improved stop light circuit closer actuated as an incident to application of the brakes.

In the accompanying drawing:

Figure 1 is an elevational view of a rear portion of a bicycle frame illustrating my invention applied thereto;

Figure 2 is a view taken from the position indicated by line 2—2 of Figure 1;

Figure 3 is a view taken from the position indicated by line 3—3 of Figure 2;

Figure 4 is a sectional view along the line 4—4 of Figure 2; and

Figure 5 is a view taken from the position indicated by line 5—5 of Figure 4.

In the embodiment selected to illustrate my invention, I make use of a bicycle frame structure 10 and the chain sprocket 11 actuated through the medium of pedals 12 in the usual manner. The stop light 13 is mounted on the member 14 of the frame 10, and the light is connected with a switch unit 15 through the medium of leads 16 and 17, with a suitable battery interposed in the lead 16 as a current supply for the lamp, which battery may be enclosed in a box 18 secured to the horizontal member 19 of the frame 10.

Switch unit 15 comprises a shaft 20 rotatably journaled in the walls 21 and 22 of a box 23 secured to the two members 24 of the frame 10. Fig. 4 illustrates the wall 25 of the box as being provided with a boss 26 having a threaded bore 27 and curved faces 28 opposite the curvatures 29 of a bar 30. A screw 31 extends loosely through an opening 32 in the bar 30 and is threaded into the opening 27. The curved faces 28 engage the frame members 24 oppositely the curvatures 29 so that the box 23 may be firmly secured in position through tightening of the screw 31. A head 33 is provided on the screw 31 to facilitate manipulation thereof. Because of the shapes of the curved faces 28 and the curvatures 29, the box 23 is firmly secured against lateral displacement.

Intermediate the ends of the shaft 20 is provided a worm 34 having threaded connection with a plate 35 having relative movement longitudinally of the shaft 20, as when the latter is rotated. Fig. 4 illustrates the normal position of the plate 35, at which time the plate abuts a collar 36 fixed to the shaft 20 by a set screw 37. Plate 35 is located between the collar 36 and a collar 38 secured to the shaft 20 by a set screw 39 and lying against the wall 22. Shaft 20 is provided with an enlargement 40 engaging the wall 22 opposite the collar 38 so as to restrain the shaft 20 from relative longitudinal movement but permitting rotary motion thereof. A pinion 41 is secured to the enlargement 40 so that the shaft 20, the enlargement and the sprocket function as a unit.

Pinion 41 is in mesh with a gear 42 of considerably larger diameter than the pinion, which gear is secured to the sprocket 11 by bolts 43 passing through spacing sleeves 44 mounted on the bolts. Counter-clockwise rotation of the sprocket 11 and the gear 42, as when the bicycle is being propelled in a forward direction and as illustrated in Fig. 1, imparts a clockwise rotation to the pinion 41 and the shaft 20. Such rotation of the worm 34, as indicated by the arrow 45 in Fig. 5 causes the plate 35 to be moved against the collar 36, and the plate is resiliently urged against the collar by reason of two spring arms 46 secured to the wall 25 of the box 23. With the plate 35 lying against the collar 36, normal rotation of the shaft 20, as when the bicycle is being propelled in a forward direction, causes the plate 35 to be rotated with the shaft as a unit.

To the walls 47 and 48 are respectively secured resilient contact arms 49 and 50 provided with normally spaced points 51 and 52. Arms 49 and 50 are insulated from the walls 47 and 48, and the arms are secured to their respective walls by bolts 53 and 54 which function as terminal connections for the leads 16 and 17.

Figs. 4 and 5 illustrate the normal spacing of the contact arms 49 and 50 when the bicycle is being propelled in a forward direction. A hump 55 is formed in the contact arm 49 for engagement with the plate 35 as the latter is advanced in the direction of the collar 38. The hump is slightly spaced from the plate 35 in the normal position of the latter so as to minimize wear and eliminate friction.

Spring arms 46, in exerting pressure on the plate 35, restrain the plate from rotation when the shaft 20 is rotated in a reverse direction, as when the coaster brake of the bicycle is being applied. Such reverse rotation of the worm 34 brings the plate 35 into engagement with the hump 55 and bends the contact 49 to bring its contact point 51 into engagement with the contact point 52 on the arm 50, thus closing the circuit through the stop light 13. While slight movement of the plate 35 axially of the worm 34 is sufficient to close the circuit through the stop light 13, there may be times when the plate is caused to move considerable distances. However, the contacts 49 and 50 are flexible and the travel of the plate is limited by reason of the collar 38, which functions identically with the collar 36, assuming that the plate 35 is brought into engagement with the collar 38. Thus the contacts 49 and 50, together with the spring arms 46, are afforded protection against excessive bending.

The specific structure of the present invention is easily applied to bicycles of conventional design and operates in an efficient manner for closing the circuit through the stop light 13 upon reverse rotation of the pedals 12. The system operates to suddenly flash the stop light 13 upon reverse movement of the chain sprocket. Through maintaining a reverse torque on the sprocket in case of a broken chain or a faulty coaster brake, the light 13 may maintain continuous illumination.

Without further elaboration, the foregoing will so fully illustrate my invention that others may, by applying current knowledge, readily adapt the same for use under various conditions of service.

I claim:

1. A switch of the type described comprising a support, normally spaced contacts, a rotary screw carried by said support, abutments on said screw, a plate threadedly connected with said screw and located between said abutments, one of said contacts being arranged in the path of said plate, spring means acting on said plate to urge the latter against one of said abutments, and means for rotating said screw to move the plate against said one contact to move the latter into engagement with the other contact upon rotation of the screw in one direction but to separate the contacts upon rotation in the opposite direction.

2. A switch of the type described comprising a support, a screw rotatably carried by said support, spaced abutments on said screw, a plate threadedly connected with said screw and located between said abutments, said plate normally lying against one of said abutments, resilient means urging the plate in the direction of said one abutment and to restrain the plate from rotation when spaced from both said abutments and when the screw is turned, two normally spaced contacts, and means for rotating the screw to shift said plate into engagement with one of said contacts to move the latter into engagement with the other contact upon rotation of the screw in one direction but to separate the contacts upon rotation of the screw in the opposite direction.

3. A switch of the type described comprising a support, a screw rotatably carried by said support, spaced abutments on said screw, a plate threadedly connected with said screw and located between said abutments, said plate normally lying against one of said abutments, resilient means urging the plate in the direction of said one abutment and to restrain the plate from rotation when spaced from both said abutments and when the screw is turned, two normally spaced contacts, and means for rotating the screw to shift said plate into engagement with one of said contacts to move the latter into engagement with the other contact upon rotation of the screw in one direction but to separate the contacts upon rotation of the screw in the opposite direction, said plate rotating as a unit with said screw upon engagement with either of said abutments.

JOHN KURILLA.